United States Patent [19]
Demido

[11] 3,877,227
[45] Apr. 15, 1975

[54] SUPPORTED LINE PRESSURE POWER BRAKE ASSEMBLY

[75] Inventor: Michael Demido, Troy, Ohio

[73] Assignee: General Motors Corporation, Detroit, Mich.

[22] Filed: May 3, 1974

[21] Appl. No.: 466,613

[52] U.S. Cl. .................... 60/548; 60/552; 91/370; 91/391 R
[51] Int. Cl. ..................... F15b 7/00; F15b 13/10
[58] Field of Search .................... 60/547, 548, 552; 91/370–373, 434

[56] References Cited
UNITED STATES PATENTS

| | | | |
|---|---|---|---|
| 2,488,173 | 11/1949 | Churn | 91/370 |
| 2,560,813 | 7/1951 | Nelson | 91/370 |
| 3,076,441 | 2/1963 | Ayers, Jr. | 91/434 X |
| 3,171,329 | 3/1965 | Rasmussen | 91/434 |
| 3,252,382 | 5/1966 | Kellogg et al. | 91/434 |
| 3,618,321 | 11/1971 | Moran | 60/548 |
| 3,699,680 | 10/1972 | Shellhause | 60/548 X |
| 3,808,817 | 5/1974 | Bennett | 60/548 |

Primary Examiner—Martin P. Schwadron
Assistant Examiner—Harold Burks
Attorney, Agent, or Firm—K. H. MacLean, Jr.

[57] ABSTRACT

A hydraulic brake and booster assembly having a pressure chamber within a housing adapted to receive high pressure hydraulic fluid to produce a pressure force upon a power piston which moves to pressurize brake fluid in an associated master cylinder assembly. Actuation of the booster assembly is by a pedal and connected push rod which establishes the position of a control valve within the housing. A reaction force which opposes movement of the push rod is developed to enable the vehicle operator to sense braking. This is accomplished by routing hydraulic fluid from the pressure chamber against the end of a piston operably connected to the push rod. A reaction sleeve slidable over the piston is engaged by a compression spring so that pressure in the compression chamber causes spring compression which moves the reaction sleeve toward a shoulder on the piston. When the sleeve engages the shoulder, reaction force related to the sleeve area is exerted on the piston and the push rod and pedal to increase the reaction force whenever fluid pressure in the pressure chamber exceeds a predetermined pressure level.

2 Claims, 1 Drawing Figure

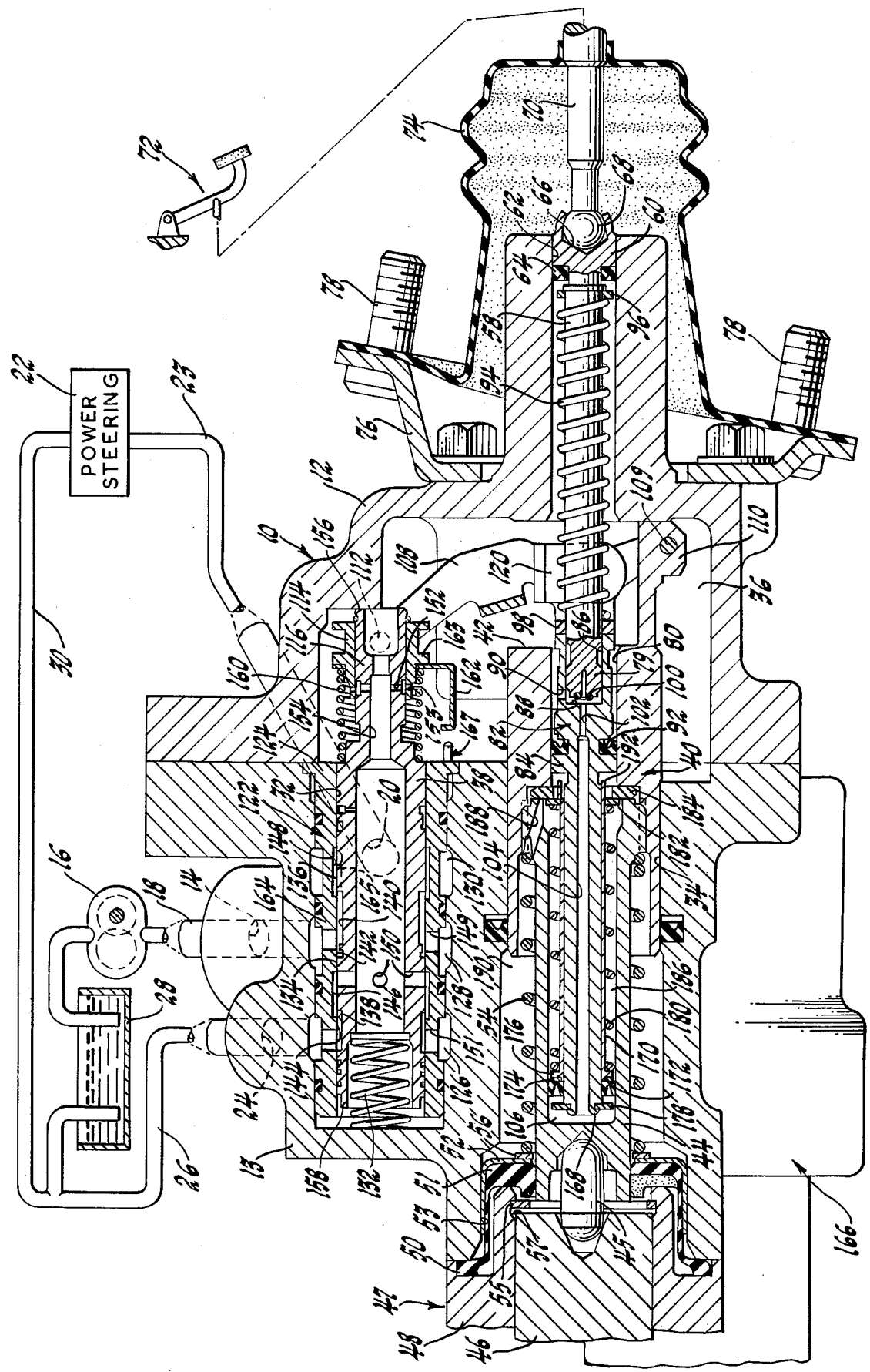

SUPPORTED LINE PRESSURE POWER BRAKE ASSEMBLY

This invention relates to hydraulic brake booster assemblies and, more particularly, to a booster having a two-stage reaction force producing mechanism.

In hydraulic brake booster assemblies, pressurized fluid from a power steering pump is introduced into a pressure chamber to produce a force upon a power brake piston. The pressure in the chamber is regulated by movement of a control valve which is positioned by the brake pedal which is controlled by the vehicle operator. It is common to provide reaction force producing means to oppose the operator-actuating force on the pedal so as to provide a sensory response to the brake pressure applied by the operator.

For normal light and medium braking, a relatively low reaction force is desirable so as not to tire the operator. However, when heavy braking is necessary, a greater reaction force is desirable to provide a satisfactory sensory response for the vehicle operator during braking. In prior brake boosters, a choice is usually made between providing a large reaction force or a lesser force. Any single level accepted will be a compromise and not particularly desirable. If a relatively small area for contact with the fluid pressure is chosen, the reaction force may be insufficient during period of heavy braking. As a result, the vehicle operator may apply excessive pressure on the brake pedal. If a relatively large area is chosen, the reaction force on the brake pedal may be too large. This may result in the application of insufficient pedal pressure.

The present invention provides a two-stage reaction force mechanism which produces relatively light reaction forces during light and medium braking and larger reaction forces when the pressure in the pressure chamber exceeds a predetermined value.

Therefore, an object of the present invention is to provide a hydraulic brake booster assembly with a reaction force producing means to create a first level of reaction forces during light and medium braking and second greater level of reaction forces during heavy braking.

Another object of the present invention is to provide a hydraulic brake booster assembly in which the hydraulic pressure in the pressure chamber is directed to act first on a small piston area to create a relatively low reaction force and then when a predetermined pressure level is exceeded the pressure causes engagement of a larger force-producing area to increase the reaction forces.

Further objects and advantages of the present invention will be more readily apparent from the following detailed description, reference being had to the accompanying drawing in which a preferred embodiment of the invention is clearly illustrated.

In the drawing, a schematic of a brake system is illustrated with a sectioned view of the subject hydraulic brake booster assembly.

A brake booster assembly 10 is illustrated including housing portions 12 and 13. The housing 13 has an inlet 14 communicated to the outlet or high pressure side of a vehicle power steering pump 16 by a conduit 18. An outlet port 20 in housing 13 is fluidly communicated to the inlet of the vehicle power steering gear 22 by a conduit 23. The housing 13 also has an exhaust port 24 therein connected by a conduit 26 to a reservoir 28. The outlet of the power steering assembly 22 is also connected to the reservoir 28 by a conduit 30.

Assembly 10 has a first valve bore 32, a power bore 34, and a pressure chamber 36 within the housings 12, 13. A spool valve 38 is slidably mounted in the valve bore 32 and is adapted to control communication between ports 14, 20 and 24. A large power piston 40 is slidably mounted in the bore 34 and has an end portion 42 which projects into the pressure chamber 36 and is acted on by pressurized fluid therein. An extension 44 of piston 40 and a rod link 45 operably connect piston 40 to an actuating member 46 of a master cylinder assembly 47 which is mounted to the left of housing 13 (only a portion of the master cylinder housing 48 is visible). An annular seal member 50 is placed between housings 13 and 48 to prevent fluid leakage therebetween. The seal member 50 includes an inwardly directed portion 51 which encircles the outer diameter of the piston extension 44. A spring retainer member 52 is inserted within bore 53 of housing 13 and has a central portion which engages one end of a coil spring 54 which is utilized to return the piston 40 to its illustrated non-breaking position. A washer 56 is disposed between the spring retainer 52 and spring 54. An expansion ring 55 in a groove 57 limits rightward movement of the member 46 in housing 47.

A brake actuator rod 58 within housing 12 has an enlarged end portion 60 reciprocally mounted within the bore 62 of housing 12. An annular seal 64 prevents fluid leakage from chamber 36. The end 60 of the rod 58 forms a socket at 66, engaging a rounded end portion 68 of a push rod 70. The push rod 70 is operably connected to a brake pedal assembly 72 for actuation of the brake assembly by the vehicle operator. The push rod 70 extends through a flexible boot member 74 which may be made of a flexible material, such as rubber, and is attached to a mounting flange 76, having fasteners 78 for attaching the brake assembly 10 to the vehicle.

The other end 79 of control rod 58 extends into a bore 80 in the piston 40. More particularly, the end 79 engages a hydraulic lock reaction piston 82 having a shoulder portion 84. The hydraulic lock piston 82 has an opening or bore 86 therein which engagingly encircles the end 79 of rod 58. This permits the piston 82 to slide along the end 79 of rod 58 until end 79 abuts surface portion 88 of piston 82. A passage 90 in piston 82 communicates the pressure chamber 36 with the space formed between end 79 and surface 88. Fluid leakage between piston extension 82 and the bore 80 is prevented by a seal member 92 which is adjacent shoulder 84.

A spring 94 encircles the rod 58 and extends from a retainer 96 at rod end 60 to a washer member 98 at the end of piston 82. When the brake pedal 72 is operated to urge the rod 58 to the left, pressurized hydraulic fluid normally is introduced into the chamber 36 through valve 38. The fluid presses against the end 42 of the piston 40 to move it, the piston extension 44, rod 45 and the master cylinder actuator 46 to the left. However, in the event there is a pressure failure, the end 79 of the rod 58 can be moved to the left within the bore 86 to cause O-ring 100 to engage the end surface 88 of lock piston 82 to block bleed passage 102 in the lock piston 82. The bleed passage 102 and a passage 104 extend from the space between rod 58 and piston 82 to a reaction chamber 106 located within the piston extension member 44. The blockage of passage 102 traps a quantity of hydraulic fluid in chamber 106 to cause the pedal 72, rods 58 and 70, piston 82 and the piston extension 44 to move rightward as a unit due to the hydraulic lock therebetween. This directly transfers force from pedal 72 to member 46 of the master cylinder assembly 47 for manual activation of the braking system.

One end of a lever 108 is pivotally attached by a fastener pin 109 to an extension 110 of piston 40. A second pivotal fastener 112 connects the other end of the lever 108 to a small piston member 114 which is slidably mounted on a reduced diameter portion 116 of the spool valve 38. The mid-portion of lever 108 is connected to a bracket member 120 which engages spring 94 and moves along the rod 58. The spring 94 yieldably urges the lever 108 to follow the movements of control 58.

The spool valve 38 is reciprocally mounted within bore 32 which is formed in a sleeve member 122 having an enlarged head portion 124 for axially positioning the sleeve member in the housing portion 13. Annular fluid passages 126, 128 and 130 formed between the housing 13 and sleeve member 122 are communicated respectively with exhaust port 24, the inlet port 14 and the outlet port 20. O-rings are located to either side of the passages 126, 128 and 130 to prevent fluid leakage therebetween. Spring 132 exerts a rightward force on the spool valve 38 to move it towards the right in FIG. 1.

Spool valve 38 includes lands 134 and 136 and grooves 138 and 140 which cooperate with the lands 142 and 144 and grooves 146 and 148 of the sleeve member 122 to control fluid communication into and out of the pressure chamber 36. The inlet port 14 is communicated by a passage 149 in sleeve 122 with groove 140. The outlet port 20 is communicated with groove 148 and the return port 24 is communicated by a passage 151 with groove 138. Passages 150, 152 and 154 in the spool valve 38 communicate the return port 24 with the pressure chamber 36 when the spool valve is in its illustrated first operative position with end 156 engaging housing 12. This is shown in FIG. 1 and corresponds to an inactive operational mode of the booster assembly. The spool valve 38 is shiftable to a second operative position characterized by engagement of the end 158 with the housing portion 13. This second operative position corresponds to normal application of the brakes. During this mode of operation, the spring 160 urges the small piston member 114 to the right on the reduced diameter portion 116 of valve 38. A washer member 162 is disposed between spring 160 and a shoulder 163 on the piston member 114. This maintains alignment of passages 152, 153 to permit pressurized fluid to flow from the inlet 14 into the pressure chamber 36.

When the brakes are applied, valve 38 is moved to the left towards the aforedescribed second position to cause land 136 on valve 38 to cooperate with portion of sleeve 122 and to produce a flow restriction through groove means in land 136 which are indicated by the hidden line 165. The flow restriction of the groove means 165 causes the fluid pressure to increase in the inlet 14 and in groove 140. A portion of this pressurized fluid is communicated to pressure chamber 36 by flow between lands 134 and 142 and through groove 146, hence through passages 150, 152, 153 and 154. The pressurized fluid communicated to the pressure chamber 36 acts against the end 42 of piston 40 to urge the piston to the left in FIG. 1. This movement is transmitted by the piston extension 44 and rod link 45 to the master cylinder assembly in which actual brake pressure is generated.

Although a portion of the fluid during braking application is directed to the pressure chamber 36, the remainder will be passed to outlet port 20 through the groove means 165 and on to the power steering gear 22.

When the fluid pressure from source 16 is inadequate to provide necessary power braking, increased force on the brake pedal 72 by the vehicle operator causes further movement of push rod 70 and control rod 58 to the left. This shifts the bracket 120 and lever 108 towards the left. After the spool valve 38 is moved to its second operative position, further force on piston 114 moves it against spring 160 to misalign passages 153 and 152. This blocks further communication between inlet 14 and pressure chamber 36. The isolation of chamber 36 from inlet 14 is necessary to prevent an abrupt discharge of pressurized fluid into chamber 36 in the event the fluid pressure source 16 regains its pressure-producing capacity.

The leftward movement of piston 114 on the end of spool valve 38 causes member 162 to open an accumulator relief valve 167 (partially visible). The opening of the valve causes the release of stored pressurized hydraulic fluid from a hollow accumulator portion 166 of housing 13. This permits pressurized hydraulic fluid to flow into the pressure chamber 36 to move the piston 40 against the actuating member 46 of the master brake assembly. For more specific details of the accumulator 166 and the accumulator release valve 167, reference is made to copending applications Ser. No. 419,090 filed Nov. 26, 1973 and Ser. No. 433,204 filed Jan. 14, 1974, both assigned to General Motors Corporation.

As previously explained, the subject invention includes means producing for two-stage reaction force against the brake pedal 72 to better enable the vehicle operator to sense braking. Initial light reaction force is provided by the force of hydraulic pressure against the end area 168 of the hydraulic lock piston 82. The pressurized fluid is emitted to chamber 106 through passages 90, 102 and 104. The cross-sectional area of the surface 168 is substantially smaller than the cross-sectional area of bore 80 or the shoulder 84 and seal 92. In addition, the force produced by pressure on seal 64 and end 60 counterbalances the force on seal 92. During light braking, the reaction force toward the right provides a light reaction force against pedal 72 and provides a sensory reaction to the vehicle operator. The relative bores 62, 80 may be varied in size to provide desired reactions.

When the pedal assembly 72 is activated for heavy braking, the pressurization in chamber 36 is greatly increased and the pressure in chamber 106 causes a reaction sleeve 170 to move to the right. The fluid force against seal 172 produces a force on washer member 174 and a shoulder 176 of the reaction sleeve 170. A retainer 178 on piston 82 limits leftward movement of the seal 172. Increasing hydraulic pressure in chamber 106 causes the reaction sleeve 170 to move to the right, compressing spring 180. The left end of spring 180 engages shoulder 176 and the right end engages a washer 182 which bears against a piston stop member 184 supported by the piston 40. Piston stop 184 transmits the spring force to the piston 40 and limits leftward movement of the hydraulic lock piston 82 by engagement with shoulder 84. The space 186 around reaction sleeve 170 is vented by a port 188 to the chamber 190 around piston extendion 44. This chamber is not pressurized and may be vented to atmosphere. Thus, there is no significant pressure in chamber 186 to oppose movement of the reaction sleeve 170 to the right.

Upon attaining a predetermined hydraulic pressure within chamber 106, the force upon reaction sleeve 170 is sufficient to move the right end 192 of the reaction sleeve 170 against shoulder 84 of the hydraulic lock piston 82. Thereafter, with increases of hydraulic pressure in chamber 106, the force of the hydraulic pressure against the annular area of seal 172 is directly transmitted to the hydraulic lock piston 82 and hence through rods 58 and 70 to the brake pedal 72. This provides an increased reaction force equal to the product of the hydraulic pressure in chamber 106 and the cross-sectional area of the bore defining chamber 186. Thus, during heavy braking, a substantially greater reaction force against the pedal 72 is produced than during light braking caused by the supplemental force of reaction sleeve 170 against piston 82.

In a preferred embodiment of the subject hydraulic brake booster, the cross sectional areas of bores 62 and 80 are equal. This produces opposite and equal forces on members 58 and 82 caused by the pressure force on seals 64 and 92. These forces are effectively cancelled. The reaction force in a light or medium braking situation is equal to the pressure in chamber 106 times the cross-sectional area of the end 168 of piston 82. During heavy braking, the hydraulic pressure in chamber 106 is greater than the predetermined pressure needed to move end 192 of sleeve 170 against shoulder 84 and, therefore, the reaction force on the pedal 72 is equal to the product of the hydraulic pressure in chamber 106 and the cross-sectional area of the bore defining chamber 186. The areas of bore 80 and 62 may be changed with respect to one another to produce desirable reaction effects.

Although the embodiment illustrated is a preferred embodiment, other embodiments may be adapted.

What is claimed is as follows:

1. In a hydraulic power brake booster assembly having a housing with a pressure chamber therein and operator-actuated brake control means including a pedal rod means extending through said pressure chamber and a reaction piston, means including said reaction piston for producing sequential multistage reaction forces against said pedal in response to changes in pressurization in said pressure chamber comprising: said reaction piston being operably connected to said rod means to transmit reaction forces back to said pedal for providing the vehicle operator with a feeling of braking action; an elongated portion of said reaction piston extending into chamber means fluidly communicated with said pressure chamber and having surrounding wall means spaced from said elongated portion; said elongated portion having an end surface against which fluid pressure acts to produce a first level of reaction force opposing the operator's force on said pedal; a reaction sleeve member reciprocally mounted on said elongated portion with seal means associated with one end and engaging the surrounding wall of the chamber means to present an annular area acted upon by said pressurized fluid to produce a supplemental reaction force and a resultant second level of reaction force upon said pedal; spring means engaging at one end of said reaction sleeve producing a force thereon opposing movement of the sleeve caused by pressurized fluid acting on said seal means; said spring means being supported at the other end in a noncommunicating manner with respect to said pedal so as not to impose a force thereon; means on said reduction piston adapted to be engaged by the second end of said reaction sleeve after a predetermined movement of the reaction sleeve against said spring whereby upon engagement the supplemental reaction force is added to the first level of reaction force to produce a second level of reaction force in response to increased pressurization of said pressure chamber.

2. In a hydraulic power brake booster assembly having a housing with a pressure chamber therein and operator-actuated brake control means including a pedal, rod means extending through said pressure chamber and a reaction piston, means including said reaction piston for producing sequential multistage reaction forces against said pedal in response to changes in pressurization in said pressure chamber comprising: said reaction piston being operably connectted to said rod means to transmit reaction forces back to said pedal for providing the vehicle operator with a feeling of braking action; an elongated portion of said reaction piston extending into chamber means fluidly communicated with said pressure chamber and having surrounding wall means spaced from said elongated portion; said elongated portion having an end surface against which fluid pressure acts to produce a first level of reaction force opposing the operator's force on said pedal; a reaction sleeve member reciprocally mounted on said elongated portion and having a radially enlarged portion extending toward said surrounding wall means; an annular seal member adjacent said radially enlarged portion and engaging the surrounding wall means thereby presenting an annular area to be acted upon by pressurized fluid in said chamber means to produce a supplemental reaction force upon said pedal; spring means around said reaction sleeve having a first end engaging said radially enlarged portion to produce a force on said reaction sleeve opposing movement caused by pressurized fluid acting on said seal means; said spring being supported at its other end in a noncommunicating manner with respect to said pedal so as not to impose a force thereon; a shoulder portion of said reaction piston normally spaced a predetermined distance from the other end of said reaction sleeve when the pressure chamber and connected chamber means are unpressurized whereby increased fluid pressurization in said pressure chamber and connected chamber means produces a force on said sleeve causing it to initially compress said spring without applying a force on the pedal and subsequently when the sleeve engages the piston shoulder a supplemental reaction force is applied to the pedal in addition to the first level of reaction force to produce a second level of reaction force.

* * * * *